(12) United States Patent
Walters et al.

(10) Patent No.: US 12,033,153 B2
(45) Date of Patent: *Jul. 9, 2024

(54) COMPUTER-BASED SYSTEMS HAVING COMPUTING DEVICES PROGRAMMED TO EXECUTE FRAUD DETECTION ROUTINES BASED ON FEATURE SETS ASSOCIATED WITH INPUT FROM PHYSICAL CARDS AND METHODS OF USE THEREOF

(71) Applicant: Capital One Services, LLC, McLean, VA (US)

(72) Inventors: Austin Walters, Savoy, IL (US); Galen Rafferty, Mahomet, IL (US); Jeremy Goodsitt, Champaign, IL (US)

(73) Assignee: Capital One Services, LLC, McLean, VA (US)

( * ) Notice: Subject to any disclaimer, the term of this patent is extended or adjusted under 35 U.S.C. 154(b) by 333 days.

This patent is subject to a terminal disclaimer.

(21) Appl. No.: 17/677,961

(22) Filed: Feb. 22, 2022

(65) Prior Publication Data
US 2022/0253857 A1   Aug. 11, 2022

Related U.S. Application Data

(63) Continuation of application No. 16/995,721, filed on Aug. 17, 2020, now Pat. No. 11,257,091, which is a (Continued)

(51) Int. Cl.
*G06Q 20/40* (2012.01)
*G06Q 20/20* (2012.01)
*G06Q 20/34* (2012.01)

(52) U.S. Cl.
CPC ....... *G06Q 20/4016* (2013.01); *G06Q 20/204* (2013.01); *G06Q 20/341* (2013.01); *G06Q 20/409* (2013.01)

(58) Field of Classification Search
CPC ................................................. G06Q 20/4016
See application file for complete search history.

(56) References Cited

U.S. PATENT DOCUMENTS

| | | | |
|---|---|---|---|
| 9,613,353 | B1 | 4/2017 | Quigley |
| 9,875,347 | B2 | 1/2018 | Baghdasaryan |

(Continued)

FOREIGN PATENT DOCUMENTS

| | | | |
|---|---|---|---|
| WO | 2016044303 | A1 | 3/2016 |
| WO | 2019194962 | A1 | 10/2019 |

OTHER PUBLICATIONS

Ryman-Tubb, "Understanding payment card fraud through knowledge extraction from neural networks using large-scale datasets"; University of Surrey; ProQuest Dissertations Publishing; 2016.
(Continued)

*Primary Examiner* — Edward Chang
(74) *Attorney, Agent, or Firm* — Greenberg Traurig, LLP

(57) ABSTRACT

Systems and methods for performing fraud detection at POA devices based on analysis of feature sets are disclosed. In one embodiment, an exemplary method may comprise: obtaining, by a POS device, upon initiation of a transaction involving a card or a card and mobile device associated with an individual initiating the transaction, one or more sensory inputs and an identifier; mapping, by the POS device, the one or more sensory inputs to a first cluster position of a plurality of clusters; determining whether the cluster position of the cluster mapped for the transaction corresponds to a second cluster position of the at least one expected cluster associated with the known owner of the card and/or mobile device; and initiating, by the POS device, at least one second factor authentication process to establish that the individual is the known owner of the card and/or mobile device being used in the transaction.

20 Claims, 7 Drawing Sheets

Related U.S. Application Data continuation of application No. 16/695,993, filed on Nov. 26, 2019, now Pat. No. 10,748,155.

(56) References Cited

U.S. PATENT DOCUMENTS

| | | | |
|---|---|---|---|
| 10,037,517 B1* | 7/2018 | Chi | G06Q 20/4016 |
| 10,049,361 B2 | 8/2018 | Kuntagod et al. | |
| 10,187,799 B2 | 1/2019 | Dutt et al. | |
| 10,366,378 B1 | 7/2019 | Han et al. | |
| 10,482,466 B1 | 11/2019 | Walters et al. | |
| 2010/0149090 A1 | 6/2010 | Morris et al. | |
| 2013/0197968 A1 | 8/2013 | Davis et al. | |
| 2015/0281227 A1* | 10/2015 | Fox Ivey | H04L 9/3226 |
| | | | 713/168 |
| 2016/0321670 A1 | 11/2016 | Avegliano et al. | |
| 2016/0364716 A1* | 12/2016 | Bakshi | G06Q 20/3224 |
| 2017/0085562 A1 | 3/2017 | Schultz et al. | |
| 2018/0012227 A1 | 1/2018 | Tunnell et al. | |
| 2018/0046792 A1 | 2/2018 | Toqan et al. | |
| 2018/0082304 A1 | 3/2018 | Summerlin et al. | |
| 2019/0026745 A1 | 1/2019 | Fromager et al. | |
| 2019/0044942 A1 | 2/2019 | Gordon et al. | |
| 2019/0065919 A1 | 2/2019 | Maheshwari et al. | |
| 2019/0022086 A1 | 7/2019 | Weber | |

OTHER PUBLICATIONS

International Search Report and Written Opinion issued in International Application No. PCT/US2020/061686 dated Feb. 18, 2021, 8 pgs.

Supplementary European Search Report from European Patent Application No. 20893440.6 dated Sep. 26, 2023.

* cited by examiner

COMPUTER-BASED SYSTEMS HAVING COMPUTING DEVICES PROGRAMMED TO EXECUTE FRAUD DETECTION ROUTINES BASED ON FEATURE SETS ASSOCIATED WITH INPUT FROM PHYSICAL CARDS AND METHODS OF USE THEREOF

CROSS-REFERENCE TO RELATED APPLICATION(S) INFORMATION

This is a continuation of U.S. application Ser. No. 16/995,721, filed Aug. 17, 2020, now U.S. Pat. No. 11,257,091, which is a continuation of U.S. application Ser. No. 16/695,993, filed Nov. 26, 2019, now U.S. Pat. No. 10,748,155, which are incorporated herein by reference in entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in drawings that form a part of this document: Copyright, Capital One Services, LLC, All Rights Reserved.

FIELD OF TECHNOLOGY

The present disclosure generally relates to an improved computer-based platform or system, improved computing components and devices, and improved computing methods configured for one or more novel technological applications involving performing fraud detection for card-based transactions at POS devices.

BACKGROUND OF TECHNOLOGY

A computer network platform or system may include a group of computers (e.g., clients, servers, computing clusters, cloud resources, etc.) and other computing hardware devices that are linked and communicate via software architecture, communication applications, or software applications associated with electronic transactions, data processing, or account management.

SUMMARY OF DESCRIBED SUBJECT MATTER

In some embodiments, the present disclosure provides various exemplary technically improved computer-implemented methods for performing fraud detection for card-based transactions at a POS (point-of-service, or point-of-sale) device, including a method having steps such as:
  obtaining, by a point-of-service (POS) device, upon initiation of a transaction involving (1) a card or (2) the card and a mobile device associated with an individual transacting with the POS device:
    (i) one or more sensory inputs associated with a use of the one or both of the card and the mobile device for the transaction; and
    (ii) an identifier (1) associated with a known owner of the one or both of the card and the mobile device and (2) used to determine whether the one or more sensory inputs are consistent with prior transaction behavior of the owner;
  mapping, by the POS device, the one or more sensory inputs to a first cluster position of at least one particular cluster of a plurality of clusters,
    wherein the plurality of clusters defines sets of hashed, learned features regarding prior known interactions of owners of cards with POS devices, the prior known interactions being mapped by machine learning into the plurality of clusters such that prior sensory input of each owner has been mapped to at least one expected cluster;
  determining, by the POS device, when the cluster position of the at least one particular cluster mapped for the transaction matches a second cluster position of the at least one expected cluster associated with the known owner of the one or both of the card and mobile device; and
  initiating, by the POS device, at least one second factor authentication process to establish that the individual transacting with the POS device is the known owner of the one or both of the card and the mobile device being used in the transaction when the first cluster position of the at least one particular cluster does not correspond to the second cluster position of the at least one expected cluster.

In some embodiments, the present disclosure also provides exemplary technically improved computer-based systems and computer-readable media, including media implemented with or involving one or more software applications, whether resident on computer devices or platforms, provided for download via a server or executed in connection with at least one network such as via a web browser application, that include or involves features, functionality, computing components or steps consistent with those set forth herein.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

DETAILED DESCRIPTION

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

As explained in more detail, below, systems and methods for performing fraud detection at POA devices based on analysis of feature sets are disclosed. In one embodiment, an exemplary method may comprise: obtaining, by a POS device, upon initiation of a transaction involving a card or a card and mobile device associated with an individual initiating the transaction, one or more sensory inputs and an identifier; mapping, by the POS device, the one or more sensory inputs to a first cluster position of a plurality of clusters; determining whether the cluster position of the cluster mapped for the transaction corresponds to a second cluster position of the at least one expected cluster associated with the known owner of the card and/or mobile device; and initiating, by the POS device, at least one second factor authentication process to establish that the individual is the known owner of the card and/or mobile device being used in the transaction. In some embodiments, fraud detection is performed by merchants at the POS device based on a fuzzy-hash of features provided by a transaction card.

In some embodiments, the innovations herein may be implemented in connection with a financial service entity that provides, maintains, manages, or otherwise offers financial services. Such financial service entity may be a bank, credit card issuer, or any other type of financial service entity that generates, provides, manages, and/or maintains financial service accounts that entail providing a transaction card for one or more customers, the transaction card being used at a POS device in regard to such financial services. Financial service accounts may include, for example, credit card accounts, bank accounts such as checking and/or savings accounts, reward or loyalty program accounts, debit account, and/or any other type of financial service account known to those skilled in the art.

Figure 1:
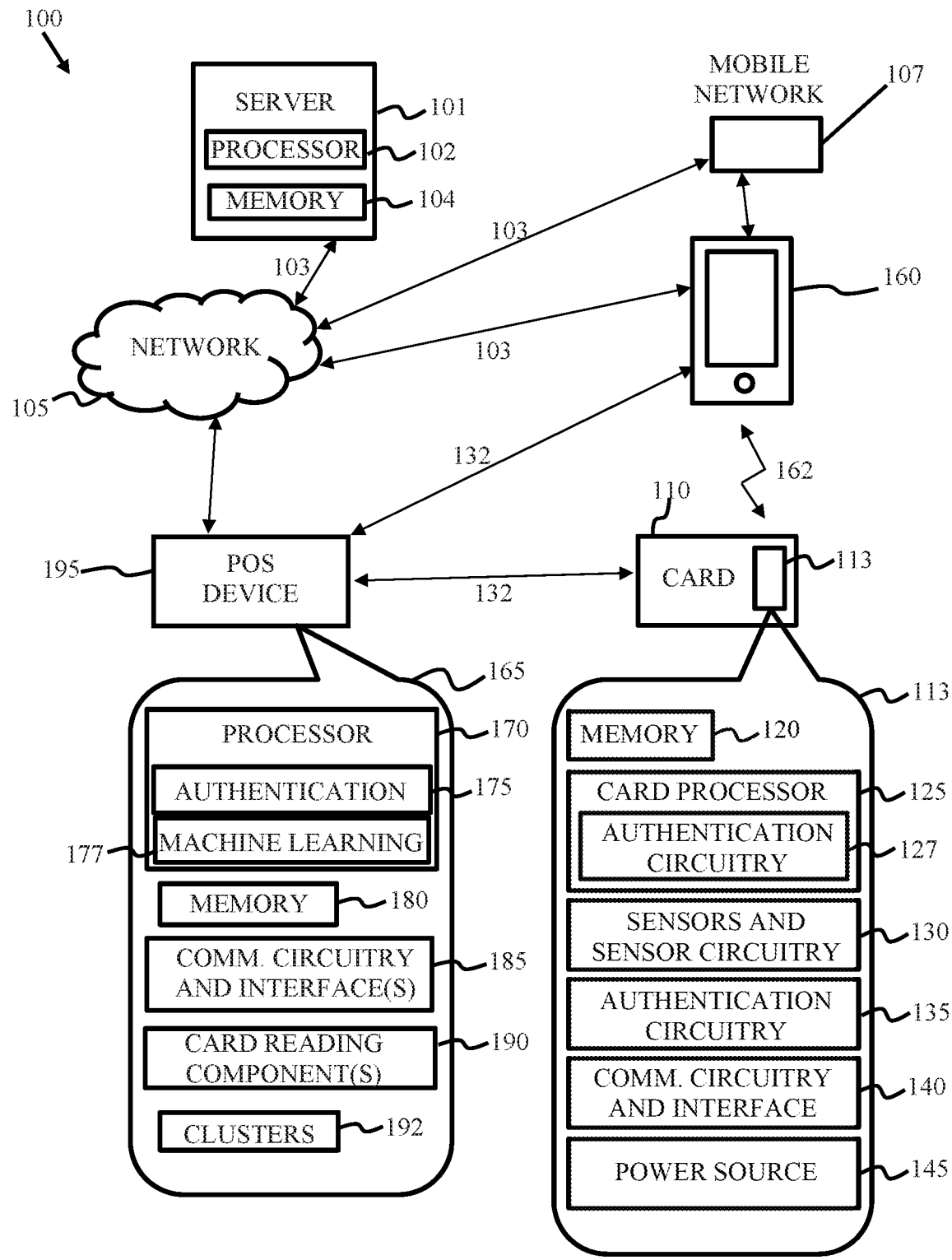
FIG. 1 is a block diagram of an exemplary system or platform involving features of performing fraud detection for card-based transactions at a POS device, consistent with exemplary aspects of certain embodiments of the present disclosure.

FIG. 1 depicts an exemplary system 100 for improved fraud detection associated with usage of a transaction card by a user, in accordance with one or more embodiments of the present disclosure. System 100 may include a server 101, a mobile device 160, a transaction card 110 with circuitry 113 disposed therein, and a point-of-service or point-of-sale (POS) device 195, which may all communicate 103 over a communication network 105. As used herein, "POS device" is defined to include both conventional POS devices known in the art, re-programmed and/or retooled (software and/or hardware) conventional POS devices, as well as other computing devices, such as smartphones, tablets, computers, etc., having physical component to obtain input from cards by way of contact and/or contactless interaction. When a user attempts a transaction with a transaction card, the business or merchant associated with the POS device 195 and typically a financial institution, such as a credit card company that has issued the card to the user, may wish to assess whether the user using the credit card is the authorized user in order to approve the transaction. Some embodiments herein may also leverage the fact that the user of the transaction card may most likely carry or is near to the user's mobile device, such as a cellphone, tablet or smartphone, for example, and may use functionality associated with the user's mobile device and the transaction card, including interaction between the two, as a part of various fraud detection and/or authentication processes for approving a transaction and/or authorizing the user to use the transaction card to purchase goods or services.

In some embodiments, server 101 may be associated with one or more entities that are stakeholders to the attempted transaction, such as the business or merchant, one or more financial services providers, such as an issuer of a credit card, debit card, or other transaction card associated with the attempted transaction.

In some embodiments, transaction card 110 may include various circuitry 113 including circuitry capable of communicating 132 various card-related information from the transaction card 113 to the POS device 195. Such card-related information may include one or both of: (i) one or more sensory inputs associated with a use of the one or both of the card and the mobile device for the transaction, and/or (ii) an identifier (1) associated with a known owner of the one or both of the card and the mobile device and (2) used to determine whether the one or more sensory inputs are consistent with prior transaction behavior of the owner.

In the embodiment shown in FIG. 1, an illustrative POS device 195 may comprise: one or more processing components and/or computer readable media 170, memory 180, communication circuitry and/or interfaces 185, at least one card reading component 190, and at least one cluster of data regarding known card-usage behavior of a plurality of card holders. The card reading component(s) 190 may be configured to read information from a transaction card 110, for example, the at least one card reading component may comprise one or more of a magnetic stripe reader, a chip reader, and/or a first near field communication (NFC) component. Communication circuitry and/or interfaces 185 may comprise at least one mobile device transceiver component configured to communicate, during execution of a purchase transaction, with a mobile device 160 presented for payment, the mobile device transceiver component comprising a second NFC component.

With regard to the disclosed innovations, the processing components and/or computer readable media 170 may be configured to execute instructions associated with performing methods such as that described below in more detail in connection with FIG. 3. By way of example, in various embodiments, the one or more processing components and/or computer readable media 170 may be configured for: obtaining, from one or both of the transaction card 110 and/or the mobile device 160, upon initiation of the transaction: one or more sensory inputs, and/or an identifier; mapping the one or more sensory inputs to a first cluster position of at least one particular cluster of a plurality of clusters 195; determining whether the first cluster position of the at least one particular cluster mapped for the transaction corresponds to a second cluster position of the at least one expected cluster associated with the known owner of the one or both of the card 110 and mobile device 160; and initiating at least one second factor authentication process to establish that the individual transacting with the POS device is the known owner of the one or both of the card 110 and the mobile device 160 being used in the transaction.

According to various embodiments, the sensory inputs may be configured to be associated with a user of the card 110 and/or the mobile device 160 involved in the attempted transaction. In some embodiments, such an identifier may be configured to be: (1) associated with a known owner of the one or both of the card and the mobile device, and/or (2) used to determine whether the one or more sensory inputs are consistent with prior transaction behavior of the owner. In some embodiments, the sensory inputs may be combined with various information regarding the transaction card and/or the user or owner, to create a set of features (or 'feature set') regarding the attempted transaction.

Historical collections of such feature set data, i.e., for each owner of a transaction card and/or mobile device, are then assembled and processed into a set of clusters comprised of a plurality of clusters that are each associated with sets of the features that define typical card transactions regarding which each user in question commonly performs. A set of recent historical feature information for any one user may define a first cluster from among the plurality of clusters, to which that user's normal transaction features will map.

In some embodiments, the clusters are created and redistributed by the server 101, for example, by a financial service provider running the server 101. Once created and/or revised, the plurality of clusters may be provided (e.g., by download or by chip or card) to POS devices, to provide the merchants associated with the POS devices a set of clusters 195 into which all customers of the financial service providers are mapped. This allows the merchants and POS devices to determine, by comparison of data received from the transaction card against the clusters 195 locally-stored in the POS device, whether the current transaction is more or less likely to be a fraudulent transaction.

Further, according to some embodiments, the clusters 192 may be configured to define sets of features regarding prior known interactions of owners of cards with POS devices 195. According to embodiments, herein, a variety of mathematical techniques may be utilized to create the plurality of clusters from card owners' historical card-usage information. For example, the plurality of clusters may be created by one or more machine learning algorithms, by hashing the feature data, by using a point-distance function of the historical feature data, by use of vector mathematics to map the historical data into the clusters, and/or by other known clustering techniques. According to exemplary embodiments discussed herein, the prior transaction data may be configured into clusters that define sets of hashed, and/or learned features regarding prior known interactions of owners of cards with POS devices. Further, the prior known interactions may be configured to be mapped by machine learning techniques into the plurality of clusters. Here, for example, the prior known interactions may be configured to be mapped by machine learning techniques into the plurality of clusters such that learned features including prior sensory inputs for each card owner have been mapped to at least one expected cluster.

In some instances, such as when the first cluster position of the at least one particular cluster does not correspond to the second cluster position of the at least one expected cluster, the POS device (e.g., via the processing components and/or computer readable media) may be configured to provide risk assessment and/or set a risk score (and take appropriate action) as a function of how far outside the owner's predicted cluster an attempted transaction falls. Here, for example, at least one second factor authentication process may be initiated, if the mapped cluster is too far from the expected cluster, to establish that the individual transacting with the POS device 195 is the known owner of the one or both of the card 110 and/or the mobile device 160 being used in the transaction.

It is noted that the disclosed POS devices, systems, platforms, methods, and computer-readable media include or involve a fraud detection mechanism that may include and/or involve a POS device 195 configured to perform various automated functionality set forth herein. Unlike conventional software and solutions, the present innovations may utilize an improved POS device 195 that may, via obtaining the features and sensory inputs from the transaction card as well as the mapping of the sensory inputs to a cluster position of a plurality of clusters, be configured to detect fraud at the point-of-service, in the moment prior to authorizing the transaction. In these and other ways, implementations involving the present POS devices 195 and associated features, functionality, and POS fraud detection mechanisms represent improvements over existing fraud detection for transactions using cards, and/or cards and mobile devices.

The disclosed mechanism of detecting fraud at point-of-service improves utilization of both processing and communication resources. As an initial matter, the present embodiments may store and map the cluster of learned features from customers on the local POS device at the merchant site. This obviates communication bandwidth otherwise used for network access during the transaction to perform fraud detection, such as with prior systems, e.g., those that require contact with a financial institution to perform the fraud detection on the server side and transmit instructions back to the POS device to authorize the transaction. Such benefits are achieved by embodiments that include mapping one or more sensory inputs to a first cluster position, determining when the first cluster position of the at least one particular cluster mapped for the transaction matches a second cluster, and initiating at least one second factor authentication process when the first cluster position of the at least one particular cluster does not correspond to a second cluster position of the at least one expected cluster. Further, because present embodiments need only perform a straightforward mapping of the identifier and/or feature information against a local cluster, without involving any additional entities and computer systems outside of or beyond the POS device, the processing and compute resources required are reduced substantially compared to existing techniques for fraud detection performed for POS device transactions. Moreover, improved POS devices having the disclosed fraud detection mechanisms improve responsiveness, efficiency, accuracy, robustness, autonomousness and fault-tolerance ability of POS fraud detection. Implementations herein also reduce likelihood of merchant exposure to fraud involving cards and/or mobile devices, as well as likelihood of "lag time" caused by communication or network intermittent availability or failures, thereby reducing or eliminating the need for communicating with remote entities at the moment of the transaction to make a fraud determination.

Turning back to FIG. 1, server 101 may include at least one processor 102 and a memory 104, such as random-access memory (RAM). In some embodiments, server 101 may be operated by the financial institution issuing the transaction card, by the merchant, and/or by any transaction clearing house used for authorizing the credit card for use.

Transaction card 110 may be formed from plastic, metal, or any other suitable material. Transaction card 110 may include card circuitry 113 formed directly therein, and/or disposed therein by gluing, bonding or by any suitable adhesion method for affixing circuitry to the material of transaction card 110. Card circuitry 113 may be configured to utilize any hardwired circuitry. Card circuitry 113 may be implemented as one or more integrated circuit chips, and/or electronic devices, electrically interconnected and bonded to one or more circuit boards, for example.

Card circuitry 113 may include a memory 120, at least one processor 125, sensors and circuitry associated with acquiring the sensory inputs and information 130, authentication circuitry 127, communication circuitry and interface 140, and a power source 145. Memory 120 may store code, such as for the authentication circuitry 127, which when executed by processor 125 may cause processor 125 to implement assembling and transmitting data to the POS device and/or other, related schemes herein, such as pairing with mobile device 160 to perform fraud detection, such as verifying if a user of transaction card 110 is an authorized user of the card, e.g., to approve the transaction when the user attempts to use the transaction card to purchase goods and/or services at POS device 195.

In some embodiments, power source 145 may be used to power card circuitry 113. Power source 145 may include, for example, a battery, a solar cell, and/or any suitable energy harvesting device, capable of generating enough power for powering card circuitry 113. In other embodiments, the transaction card may be powered upon swiping or inserted the card into a slot in POS terminal 195 such that the power source may be POS terminal 195 itself or any other device into which the transaction card is swiped or inserted. The transaction card 110 may also be powered by movement, or by induction, or by other near-field electromagnetic energy derived from nearby sources, such as mobile device 160, POS device 195, or other known sources. Once powered, the transaction card may begin assembling the sensory data and/or feature set for communication to the POS terminal 195.

Mobile device 160, such as a smart phone or other portable or wearable electronic device, may include mobile device circuitry. Mobile device circuitry may include a mobile device processor, a memory, such as RAM, communication circuitry and interface, and any input and/or output device, such as a touchscreen display. RAM may store code that, when executed by processor, may cause processor to implement aspects of one or more fraud detections schemes herein, including those involving pairing with transaction card 110 to verify if a user of the transaction card 110 is an authorized user of the card. In some embodiments, any transaction card application running on mobile device 160, such as an application supplied by the financial institution issuing the transaction card and/or managing the transactions of the transaction card user, may include various modules that may transmit information to the POS device, relay information back to the financial institution (e.g., server 101), and communicate with other computing components.

Various embodiments associated with FIG. 1 and related disclosure herein solve a technical problem of ensuring that a transaction card is only used by the authorized user of the transaction card, e.g., the account owner. Various features and functionality disclosed herein may be utilized in connection with fraud detection and/or authentication processes that involve pairing of transaction card 110 with mobile device 160 when implementing multi-factor authentication (MFA) schemes, for example to authorize the card for use by the user. In other embodiments, various information related to the successful pairing of the transaction card and the mobile device may be relayed back to server 101 (e.g., server processor 102) so as to approve transactions for purchasing goods and/or services with the authorized user's transaction card.

In some embodiments, an initial authentication for pairing the transaction card with the mobile device may be implemented by the user contacting the financial institution from the user's mobile device to initially authorize the pairing of transaction card 110 with mobile device 160 so as to receive pairing approval. In other embodiments, the pairing and/or unpair processes between the transaction card and the mobile device may occur automatically and seamlessly such as without any action on the part of the user, particularly if the same mobile device had been previously paired with the same transaction card in the past. In yet other embodiments, proximity MFA may use biometrics (e.g., fingerprint, voice recognition, etc.) and/or a password entered by the user and/or a swiping of the mobile device screen by a finger of the user and/or the proximity of the transaction card to the mobile device or any client device, for example, to pair or unpair the transaction card with the client.

In some embodiments, when the transaction card may include a battery as power source 145, the transaction card and the mobile device may be configured to pair with the transaction card on the fly when the transaction card is used during a transaction, so as to conserve power stored in the battery.

In some embodiments, if the transaction card is determined to be potentially in use by an unauthorized user using the embodiments taught herein, e.g. at or via POS device 195, the merchant using POS terminal 195, may generate or receive an alarm or alert that the user is potentially unauthorized (e.g., an alert on a display of POS terminal 195) or that additional authentication, such as second-factor authentication, should be performed to verify that the transaction is not fraudulent.

Figure 2:
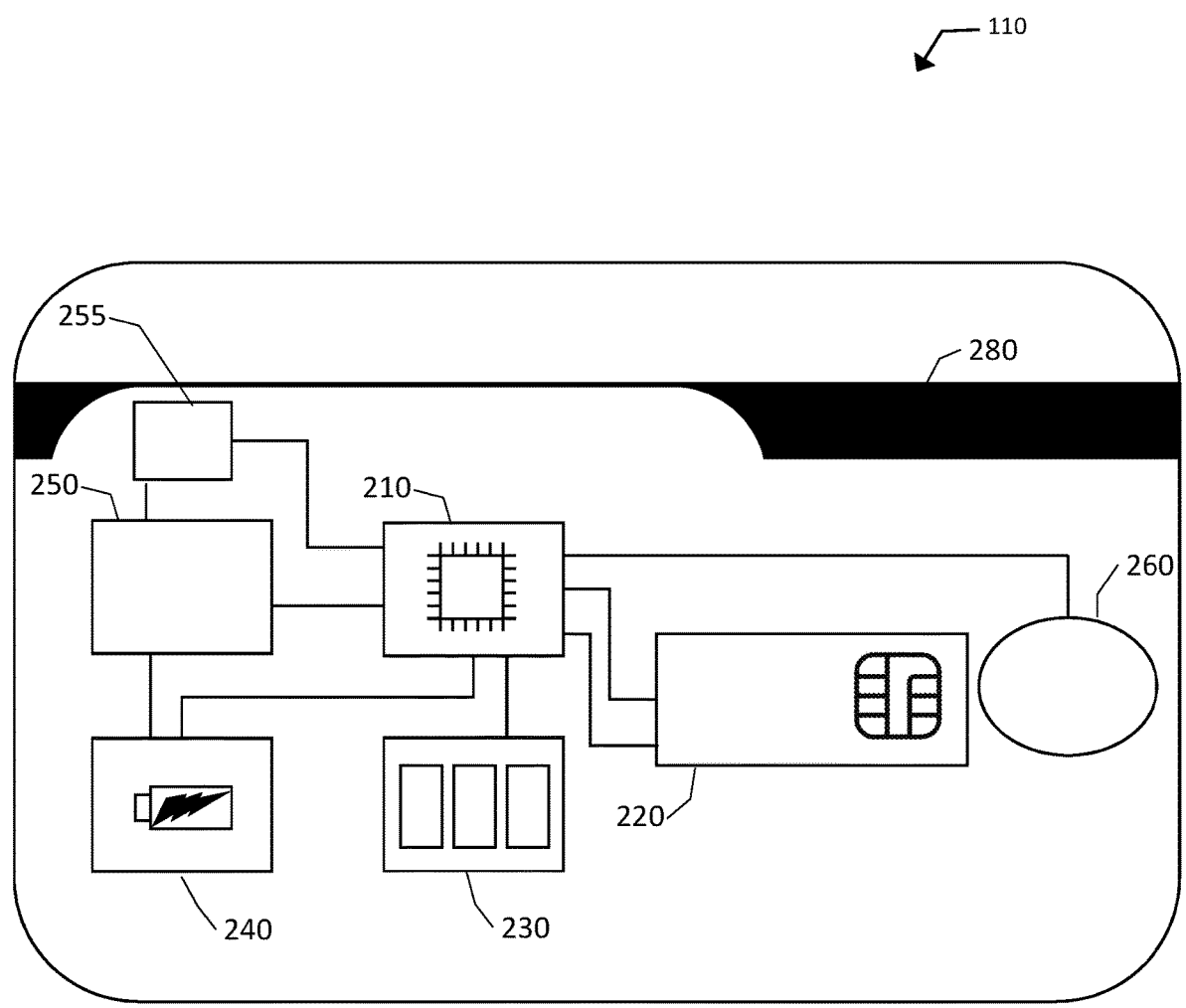
FIG. 2 is a block diagram of an exemplary transaction card, consistent with exemplary aspects of certain embodiments of the present disclosure.

FIG. 2 shows a diagram of an exemplary transaction card 110, consistent with disclosed embodiments. In some embodiments, transaction card 110 may be the approximate size and shape of a traditional credit card, debit card, or the like. Transaction card 110 may have embedded electronics for performing various aspects of the disclosed innovations. As shown, transaction card 110 may include at least one processor 210 or processing circuitry, memory 230, power source or power circuitry 240, one or more sensors 250, communication circuitry or devices 255, (optional) biometric input elements and/or circuitry 260, a magnetic stripe 280, and other coupling circuitry 220 such as an electronic chip element. Power source or power circuitry 240 may include elements that generate power for the card upon coupling to a POS device, such as by connection via an electronic chip, and/or such circuitry may include a voltage supply such as a battery. In some embodiments, transaction card 110 may include more or fewer components than shown in FIG. 2.

Processor 210 may comprise one or more known or specialized processing devices, of sufficient size and form factor to fit within transaction card 110 when configured to be about the size of a traditional credit or debit card. In some embodiments, processor 210 may include any configuration capable of performing functions related to the disclosed methods such as, for example, generating and transmitting the identifier, feature set, and/or sensory data associated with usage of the transaction card 110, which may be based on the various sensory inputs 250, 260 generated by the transaction card 110. Processor 210 may also control power source 240, send and receive data, read from and written to memory 230, receive and analyze data from sensors 250, process information or instructions associated with the coupling circuitry 220, receive and process input from the biometric input elements and/or circuitry 260, and any other functions consistent with the disclosed embodiments.

Memory 230 may include volatile or non-volatile, magnetic, semiconductor, or other type of storage elements and/or tangible (i.e., non-transitory) computer-readable medium that stores relevant data, such as information needed for or associated with conducting card transactions. With regard to the data generated by the card for mapping against the cluster stored in the POS device, such data may be stored as a set of features, which may be encrypted or otherwise secured, and/or it may be transformed, e.g., by hash, fuzzy-hash, etc., into an identifier, with the identifier being stored in memory 230 for transmission to the POS device. Data of prior features and/or identifiers may also be stored in the memory, 230, wherein a historical list of such data may be maintained and used for determining the current cluster in which the owner of the transaction card is to be assigned. In one exemplary implementation, the historical data (feature sets) regarding a card owner's prior transactions are stored in memory, and uploaded periodically to the server 101, so that the server 101 may confirm or recalculate the cluster to which the owner's expected behavior is assigned. According to embodiments herein, the memory 230 may also store user information, data needed or used by the card or the POS device to achieve the innovations herein, other computer-executable instructions and/or data known in the art.

Power source 240 may include a power storage device such as a battery or capacitor, a power receiver such as an inductive power coil or a wireless power receiver, a power generator such as a solar or kinetic power generator, or any combination thereof. In some embodiments, power source 240 may include one or more other known devices capable of generating, receiving, and/or storing electrical energy.

One or more sensors 250 may include one or more devices capable of sensing the environment around transaction card 110, movement of the transaction card 110, and/or other detectable interactions involving the transaction card 110. In some embodiments, such sensors 250 may include, for example, one or more of a camera, a microphone, a gyroscope, an accelerometer, a shock sensor, a position sensor, a light sensor such as an ambient light sensor, a temperature sensor, a touch sensor, a conductivity sensor, and/or a haptic sensor.

Sensors 250 may also include one or more buttons, switches, other tactile input mechanisms, or other forms of user-derived input for receiving an indication or instruction from a card user. In some embodiments, such input devices may receive a sequence or series of inputs, to cause processor 210 to perform various functions associated with the disclosed embodiments.

Further, while shown separately at 260, sensory inputs may also be obtained via the biometric input elements and/or circuitry 260. In some embodiments, such biometric input elements and/or circuitry 260 may include, for example, one or more of a fingerprint sensor, an optical sensor that detects one or more of a card user's face, eyes, or other distinguishing features of the card user, and/or a sensor that detects electromagnetic energy emitted from the card user.

The transaction card may, optionally, also include a display, which may comprise a screen, indicator light, or other appropriate device for displaying a status or message to user. In some embodiments, display may include a small LCD screen, e-ink screen, or OLED display or one or more LEDs. In some embodiments, display may provide notifications, prompts, and/or messages to user.

In some embodiments, transaction card 110 may include communication circuitry or devices 255 such as antennae and/or NFC (near-field communication) circuitry, for transmitting and/or receiving data from one or more external locations. Communication circuitry 255 may comprise a short-range wireless transceiver, or a near-field communication chip. Communication circuitry 255 may be configured to communicate with mobile device 160, a contactless card reader associated with the POS device 195, other systems, and/or other sensors configured to detect the presence of transaction card 110.

In some embodiments, transaction card 110 may include at least one magnetic stripe 280 or other magnetic communication medium that may share or read magnetically-stored information. In some embodiments, magnetic stripe 280 may be controlled by processor 210. For example, processor 210 may write, clear, and rewrite magnetic stripe 280, to provide particular account information.

Figure 3:
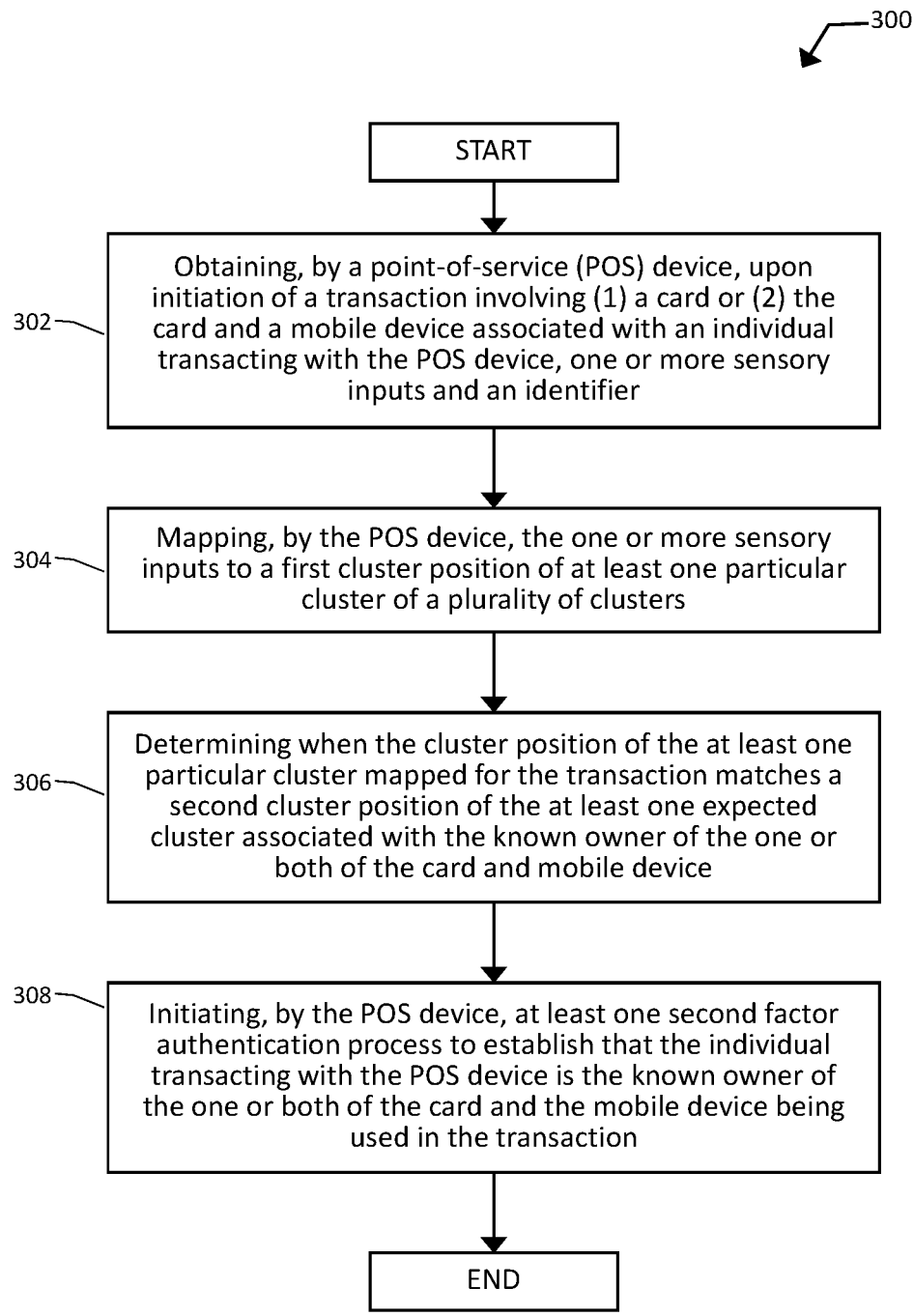
FIG. 3 is a flowchart illustrating one exemplary process related to performing fraud detection for card-based transactions at a POS device, consistent with exemplary aspects of certain embodiments of the present disclosure.

FIG. 3 is a flowchart illustrating one exemplary process 300 related to fraud detection at a POS device, consistent with exemplary aspects of at least some embodiments of the present disclosure. As shown in the exemplary flowchart of FIG. 3, an illustrative fraud detection process 300 may comprise: obtaining, from a transaction card by a POS device, upon initiation of a transaction involving: (1) a card, or (2) the card and a mobile device associated with an individual transacting with the POS device, one or more sensory inputs and/or an identifier, at 302; mapping, by the POS device, the one or more sensory inputs to a first cluster position of at least one particular cluster of a plurality of clusters, at 304; determining whether the first cluster position of the at least one particular cluster mapped for the transaction corresponds to a second cluster position of the at least one expected cluster associated with the known owner of the one or both of the card and mobile device, at 306; and initiating at least one second factor authentication process to establish that the individual transacting with the POS device is the known owner of one or both of the card and the mobile device being used in the transaction, at 308. Further, the fraud detection process 300 may be carried out by and at the POS device, as set forth in more detail elsewhere herein.

As noted above, the fraud detection process 300 may include, at 302, a step of obtaining one or more sensory inputs and/or an identifier, by a point-of-service (POS) device, upon initiation of a transaction involving: (1) a card, or (2) the card and a mobile device associated with an individual transacting with the POS device. With regard to the disclosed innovations, the one or more sensory inputs may include one or more sensory inputs associated with a use of the one or both of the card and the mobile device for the transaction. The sensory inputs may also be combined with other data and provided as a feature set. In addition, an identifier that serves to provide a summary or secure/ encrypted version of such sensory data may also be provide along with, or in place of, the sensory inputs. Further, such identifier may be configured to be: (1) associated with a known owner of one or both of the card and the mobile device; and/or (2) used to determine whether the one or more sensory inputs are consistent with the prior transaction behavior of the owner. Here, for example, the identifier may be a hashed or otherwise transformed value that corresponds to the feature set of information that the transaction card has assembled leading up to the transaction and transmitted to the POS device. In some embodiments the feature set may comprise the sensory inputs gathered by the transaction card and/or various static, fixed, and/or physical features associated the transaction card (e.g., name on card, type of card, material of card, CCV code, size of card, etc.) and/or related electronic information regarding the transaction card or owner that is difficult for fraudulent cards to emulate.

According to embodiments herein, in addition to sensor data, inputs processed regarding an attempted transaction may also include one or more of: (i) physical features of the card including one or more of: the dimensions of the card (e.g., height, width, depth, shape, etc.), the name on the card, material and/or color of the card, embossing, inscriptions and/or any other visual or tactile characteristics of the card; (ii) the location of the card, and/or the movement of the card, and/or the location of the mobile device, and/or the movement of the mobile device; and (iii) the biometric or other information regarding the individual transacting with the card, and/or the biometric or other information regarding the individual transacting with the mobile device.

As shown in FIG. 3, the fraud detection process 300 may include, at 304, a step of mapping, by the POS device, the one or more sensory inputs to a first cluster position of at least one particular cluster of a plurality of clusters. According to various disclosed embodiments, the plurality of clusters may be configured to define sets of hashed, learned features regarding prior known interactions of the owners of cards with POS devices. In some embodiments, the prior known interactions may be mapped by machine learning techniques into the plurality of clusters. In implementations, the prior known interactions may be mapped by machine learning techniques into the plurality of clusters such that prior sensory input of each owner has been mapped to at least one expected cluster.

Further, in some embodiments, the plurality of clusters may be provided to the POS device via one or both of a smart card (SIM card) and other computer-readable media. Here, for example, one or both of such smart card and such other computer-readable media may be provided from an entity associated with the one or both of the card and the mobile device. In various implementations, such an entity may be involved with preventing fraudulent transactions. In one embodiment, the plurality of clusters may be provided to the POS device via download from one or more servers associated with at least one entity involved in the prevention of fraudulent transactions.

Further, in some embodiments, the step of mapping the one or more sensory inputs to the first cluster position may comprise direct mapping of the one or more sensory inputs to the first cluster position. In some other embodiments, the step of mapping the one or more sensory inputs to the first cluster position may comprise generating a feature set or model of the one or more sensory inputs, and mapping the feature set or model to the first cluster position.

Exemplary fraud detection process 300 may also include, at 306, a step of determining whether the first cluster position of the at least one particular cluster mapped for the transaction corresponds to a second cluster position of the at least one expected cluster associated with the known owner of the one or both of the card and mobile device. According to various disclosed embodiments, step 306 may be performed by the POS device. Here, for example, some embodiments may be configured to determine when the cluster position of the at least one particular cluster mapped for the transaction matches the second cluster position at the POS device, such that a fraud determination may be performed on-site at the POS device. In some implementations, such fraud determination may be performed without the need for communicating with remote entities to make the fraud determination.

Exemplary fraud detection process 300 may further include, at 308, a step of initiating at least one second factor authentication process to establish that the individual transacting with the POS device is the known owner of the card and/or the mobile device being used in the transaction. According to various embodiments, step 308 may be performed by the POS device. Various embodiments herein may be configured to initiate such second factor authentication process when the first cluster position of the at least one particular cluster does not correspond to the second cluster position of the at least one expected cluster. In some embodiments, the second factor authentication may be triggered via processing performed by the POS device, and the second factor authentication may be performed at the POS device.

Further, according to some embodiments, the second factor authentication process may comprise generating an alert to a merchant associated with the POS device. In other embodiments, the second factor authentication process may comprise generating an alert to a financial services entity associated with one or more of the POS device, the card, and/or the owner of the mobile device.

According to some embodiments, illustrative methods herein may further comprise: receiving the one or more sensory inputs; utilizing a machine learning algorithm to generate, based on the one or more sensory inputs, a feature set representing the one or more sensory inputs; and hashing the feature set to obtain an expected cluster. Embodiments herein may be configured such that one or more of these steps may be performed by the mobile device 160. In some implementations, the feature set may be hashed to obtain the expected cluster that is specific to an individual associated with the mobile device 160. Here, for example, the machine learning algorithm may be specifically configured to an individual associated with the mobile device 160.

Further, according to some other embodiments, methods herein may also comprise authorizing the transaction when the first cluster position of the at least one particular cluster does correspond to the second cluster position of the at least one expected cluster. In various implementations, the step of authorizing as described above may be performed by the POS device.

Figure 4:
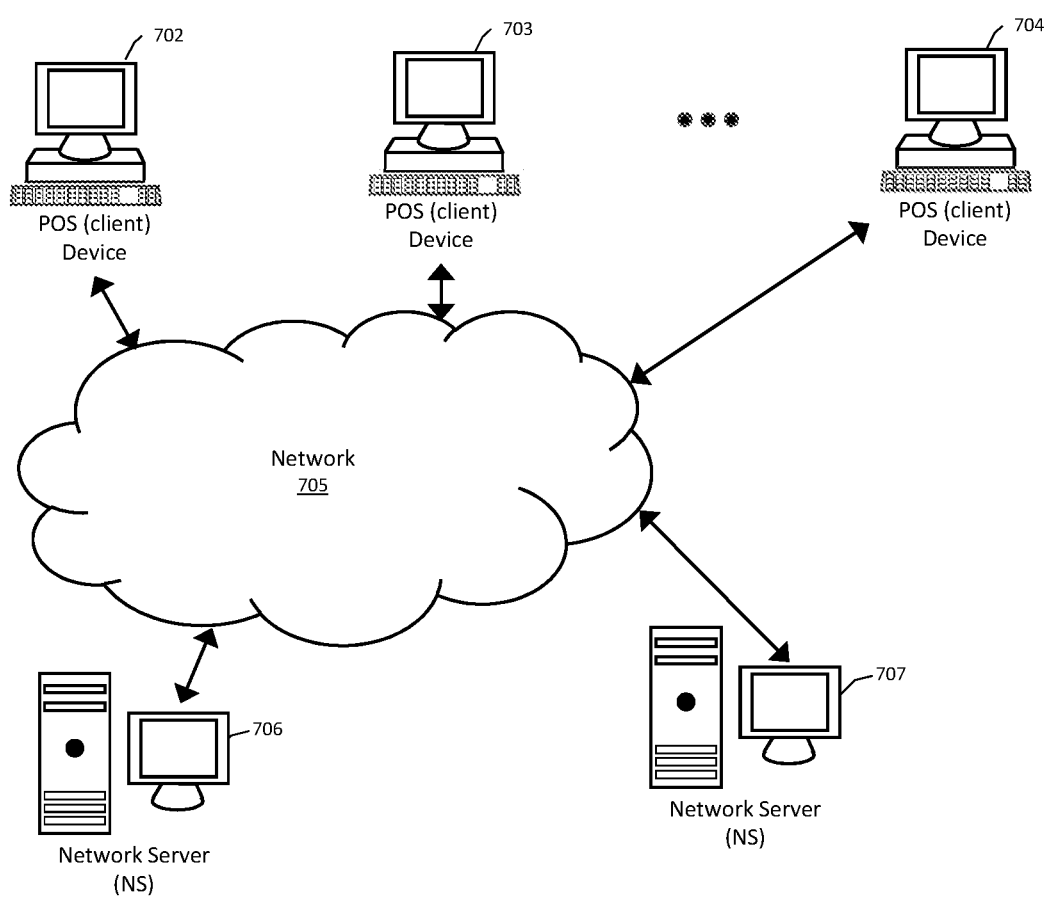
FIG. 4 is a block diagram depicting an exemplary computer-based system or platform, in accordance with certain embodiments of the present disclosure.

FIG. 4 depicts a block diagram of an exemplary computer-based system/platform in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the exemplary inventive computing devices and/or the exemplary inventive computing components of the exemplary computer-based system/platform may be configured to manage a large number of instances of software applications, users, and/or concurrent transactions, as detailed herein. In some embodiments, the exemplary computer-based system/platform may be based on a scalable computer and/or network architecture that incorporates varies strategies for assessing the data, caching, searching, and/or database connection pooling. An example of the scalable architecture is an architecture that is capable of operating multiple servers.

In some embodiments, referring to FIG. 4, members 702-704 (e.g., POS devices or clients) of the exemplary computer-based system/platform may include virtually any computing device capable of receiving and sending a message over a network (e.g., cloud network), such as network 705, to and from another computing device, such as servers 706 and 707, each other, and the like. In some embodiments, the member devices 702-704 may be personal computers, multiprocessor systems, microprocessor-based or programmable consumer electronics, network PCs, and the like. In some embodiments, one or more member devices within member devices 702-704 may include computing devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile computing device, and the like. In some embodiments, one or more member devices within member devices 702-704 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, satellite, ZigBee, etc.). In some embodiments, one or more member devices within member devices 702-704 may include may run one or more applications, such as Internet browsers, mobile applications, voice calls, video games, videoconferencing, and email, among others. In some embodiments, one or more member devices within member devices 702-704 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device within member devices 702-704 may be specifically programmed by either Java, .Net, QT, C, C++ and/or other suitable programming language. In some embodiments, one or more member devices within member devices 702-704 may be specifically programmed include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the exemplary network 705 may provide network access, data transport and/or other services to any computing device coupled to it. In some embodiments, the exemplary network 705 may include and implement at least one specialized network architecture that may be based at least in part on one or more standards set by, for example, without limitation, GlobalSystem for Mobile communication (GSM) Association, the Internet Engineering Task Force (IETF), and the Worldwide Interoperability for Microwave Access (WiMAX) forum. In some embodiments, the exemplary network 705 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 705 may include and implement, as an alternative or in conjunction with one or more of the above, a WiMAX architecture defined by the WiMAX forum. In some embodiments and, optionally, in combination of any embodiment described above or below, the exemplary network 705 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 705 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, satellite and any combination thereof. In some embodiments, the exemplary network 705 may also include mass storage, such as network attached storage (NAS), a storage area network (SAN), a content delivery network (CDN) or other forms of computer- or machine-readable media.

In some embodiments, the exemplary server 706 or the exemplary server 707 may be a web server (or a series of servers) running a network operating system, examples of which may include but are not limited to Microsoft Windows Server, Novell NetWare, or Linux. In some embodiments, the exemplary server 706 or the exemplary server 707 may be used for and/or provide cloud and/or network computing. Although not shown in FIG. 4, in some embodiments, the exemplary server 706 or the exemplary server 707 may have connections to external systems like email, SMS messaging, text messaging, ad content providers, etc. Any of the features of the exemplary server 706 may be also implemented in the exemplary server 707 and vice versa.

In some embodiments, one or more of the exemplary servers 706 and 707 may be specifically programmed to perform, in non-limiting example, as authentication servers, search servers, email servers, social networking services servers, SMS servers, IM servers, MMS servers, exchange servers, photo-sharing services servers, advertisement providing servers, financial/banking-related services servers, travel services servers, or any similarly suitable service-base servers for users of the member computing devices 701-704.

In some embodiments and, optionally, in combination of any embodiment described above or below, for example, one or more exemplary computing member devices 702-704, the exemplary server 706, and/or the exemplary server 707 may include a specifically programmed software module that may be configured to send, process, and receive information using a scripting language, a remote procedure call, an email, a tweet, Short Message Service (SMS), Multimedia Message Service (MMS), instant messaging (IM), internet relay chat (IRC), mIRC, Jabber, an application programming interface, Simple Object Access Protocol (SOAP) methods, Common Object Request Broker Architecture (CORBA), HTTP (Hypertext Transfer Protocol), REST (Representational State Transfer), or any combination thereof.

Figure 5:
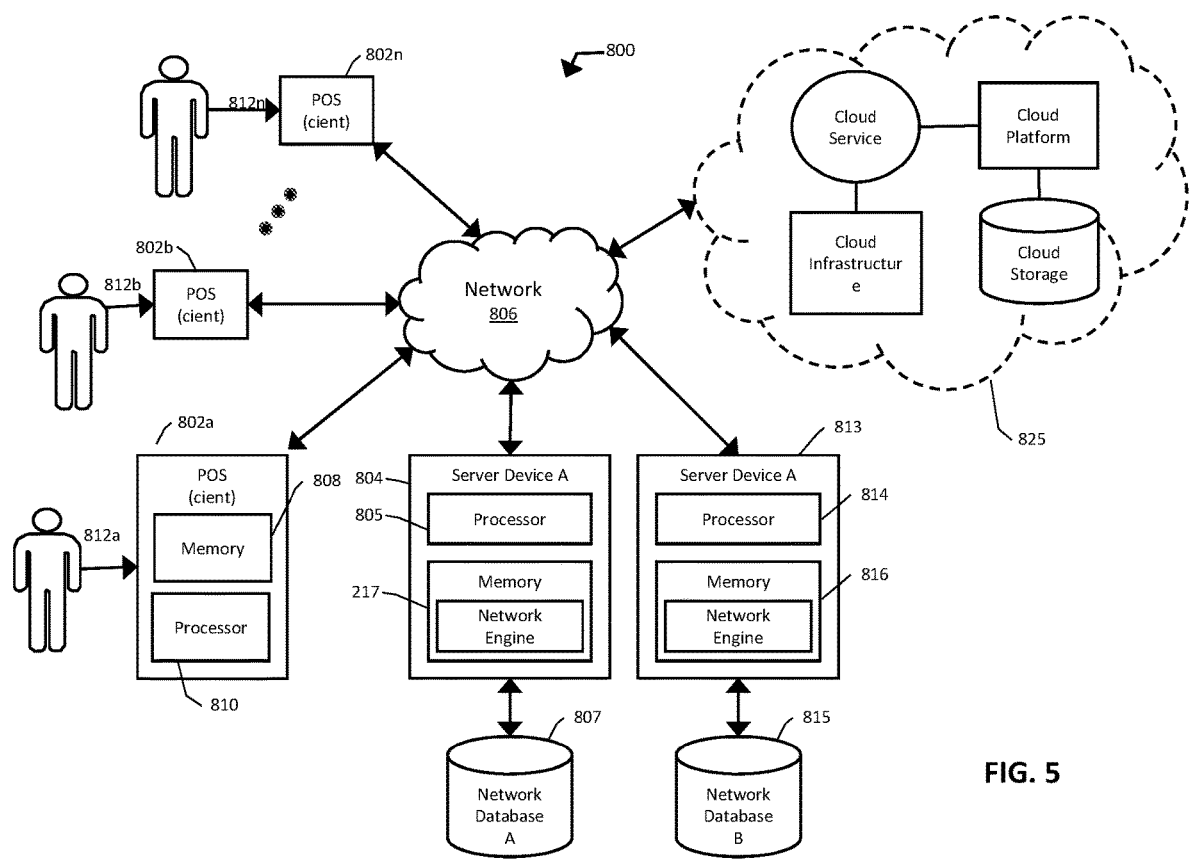
FIG. 5 is a block diagram depicting another exemplary computer-based system or platform, in accordance with certain embodiments of the present disclosure.

FIG. 5 depicts a block diagram of another exemplary computer-based system/platform 800 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member computing devices (e.g., POS devices), i.e. 802*a* and 802*b* through 802*n*, each at least includes a computer-readable medium, such as a random-access memory (RAM) 808 coupled to a processor 810 and/or memory 808. In some embodiments, the processor 810 may execute computer-executable program instructions stored in memory 808. In some embodiments, the processor 810 may include a microprocessor, an ASIC, and/or a state machine. In some embodiments, the processor 810 may include, or may be in communication with, media, for example computer-readable media, which stores instructions that, when executed by the processor 810, may cause the processor 810 to perform one or more steps described herein. In some embodiments, examples of computer-readable media may include, but are not limited to, an electronic, optical, magnetic, or other storage or transmission device capable of providing a processor, such as the processor 810 of client 802*a*, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, member computing devices 802*a* through 802*n* may also comprise a number of external or internal devices such as a mouse, a CD-ROM, DVD, a physical or virtual keyboard, a display, audio output such as a speaker, or other input or output devices. In some embodiments, examples of member computing devices 802*a* through 802*n* (e.g., clients) may be any type of processor-based platforms that are connected to a network 806 such as, without limitation, personal computers, digital assistants, personal digital assistants, smart phones, pagers, digital tablets, laptop computers, Internet appliances, and other processor-based devices. In some embodiments, member computing devices 802*a* through 802*n* may be specifically programmed with one or more application programs in accordance with one or more principles/methodologies detailed herein. In some embodiments, member computing devices 802*a* through 802*n* may operate on any operating system capable of supporting a browser or browser-enabled application, such as Microsoft™, Windows™, and/or Linux. In some embodiments, member computing devices 802*a* through 802*n* shown may include, for example, personal computers executing a browser application program such as Microsoft Corporation's Internet Explorer™, Apple Computer, Inc.'s Safari™, Mozilla Firefox, and/or Opera. In some embodiments, through the member computing client devices (802*a* through 802*n*), users (812*a* through 812*n*) may communicate over the exemplary network 806 with each other and/or with other systems and/or devices coupled to the network 806. As shown in FIG. 5, exemplary server devices 804 and 813 may be also coupled to the network 806. In some embodiments, one or more member computing devices 802*a* through 802*n* may be mobile clients.

In some embodiments, at least one database of exemplary databases 807 and 815 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 6:
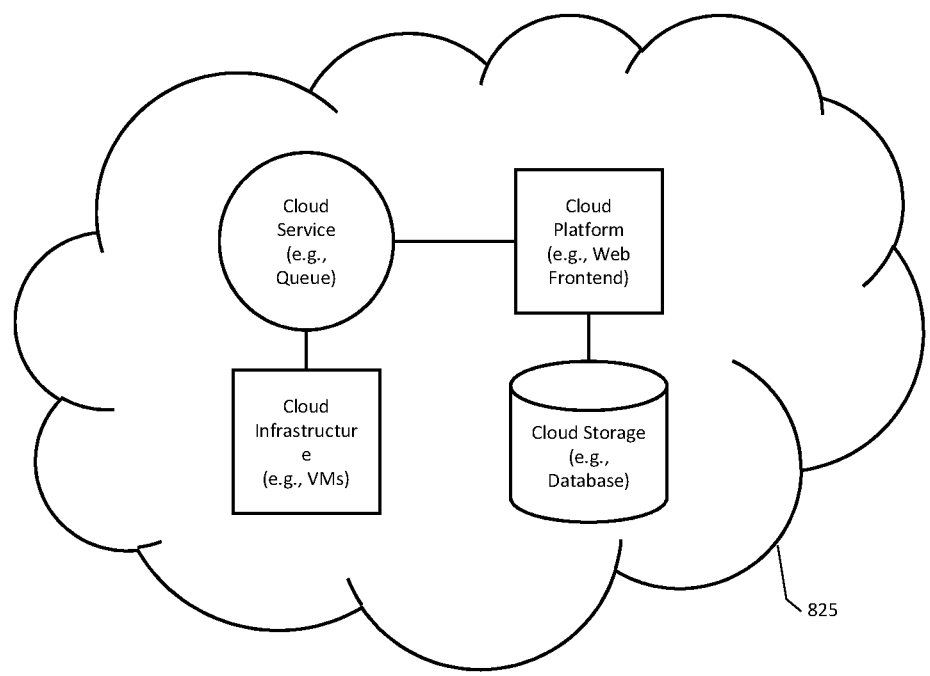
FIGS. 6 and 7 are diagrams illustrating two exemplary implementations of cloud computing architecture or aspects with respect to which the disclosed technology may be specifically configured to operate, in accordance with certain embodiments of the present disclosure.
Figure 7:
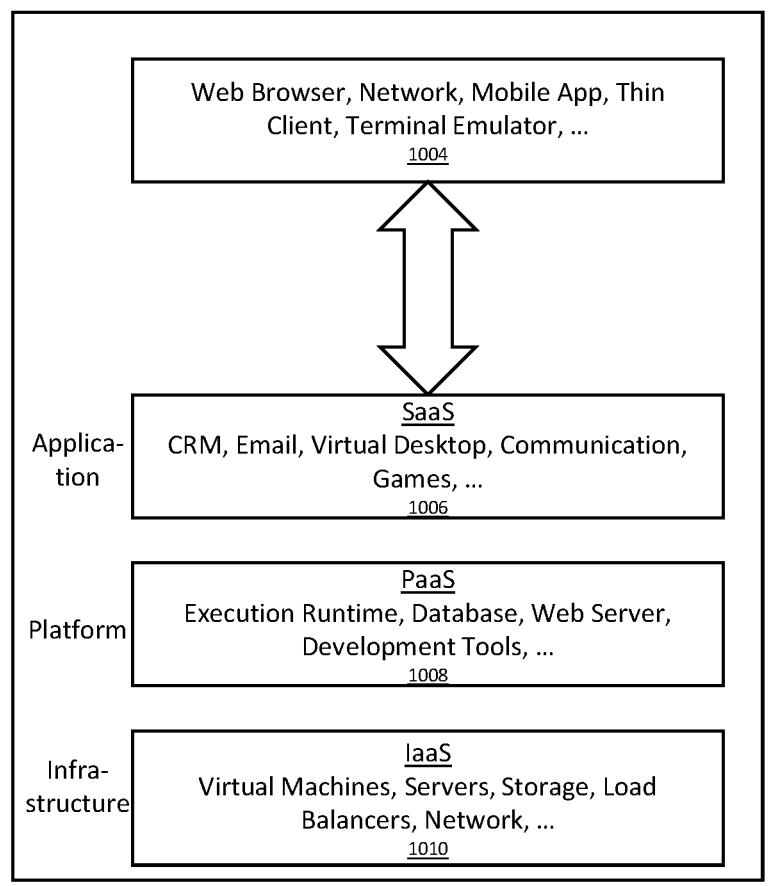

As also shown in FIGS. 6 and 7, some embodiments of the disclosed technology may also include and/or involve one or more cloud components 825, which are shown grouped together in the drawing for sake of illustration, though may be distributed in various ways as known in the art. Cloud components 825 may include one or more cloud services such as software applications (e.g., queue, etc.), one or more cloud platforms (e.g., a Web front-end, etc.), cloud infrastructure (e.g., virtual machines, etc.), and/or cloud storage (e.g., cloud databases, etc.).

According to some embodiments shown by way of one example in FIG. 7, the exemplary inventive computer-based systems/platforms, the exemplary inventive computer-based devices, components and media, and/or the exemplary inventive computer-implemented methods of the present disclosure may be specifically configured to operate in or with cloud computing/architecture such as, but not limiting to: infrastructure a service (IaaS) 1010, platform as a service (PaaS) 1008, and/or software as a service (SaaS) 1006. FIGS. 6 and 7 illustrate schematics of exemplary implementations of the cloud computing/architecture(s) in which the exemplary inventive computer-based systems/platforms, the exemplary inventive computer-implemented methods, and/or the exemplary inventive computer-based devices, components and/or media of the present disclosure may be specifically configured to operate. In some embodiments, such cloud architecture 1006, 1008, 1010 may be utilized in connection with the Web browser and browser extension aspects, shown at 1004, to achieve the innovations herein.

As used in the description and in any claims, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the terms "and" and "or" may be used interchangeably to refer to a set of items in both the conjunctive and disjunctive in order to encompass the full description of combinations and alternatives of the items. By way of example, a set of items may be listed with the disjunctive "or", or with the conjunction "and." In either case, the set is to be interpreted as meaning each of the items singularly as alternatives, as well as any combination of the listed items.

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

In some embodiments, exemplary inventive, specially programmed computing systems/platforms with associated devices are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), Bluetooth™, near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes. Various embodiments herein may include interactive posters that involve wireless, e.g., Bluetooth™ and/or NFC, communication aspects, as set forth in more detail further below. In some embodiments, the NFC can represent a short-range wireless communications technology in which NFC-enabled devices are "swiped," "bumped," "tap" or otherwise moved in close proximity to communicate. In some embodiments, the NFC could include a set of short-range wireless technologies, typically requiring a distance of 10 cm or less. In some embodiments, the NFC may operate at 13.56 MHz on ISO/IEC 18000-3 air interface and at rates ranging from 106 kbit/s to 424 kbit/s. In some embodiments, the NFC can involve an initiator and a target; the initiator actively generates an RF field that can power a passive target. In some embodiments, this can enable NFC targets to take very simple form factors such as tags, stickers, key fobs, or cards that do not require batteries. In some embodiments, the NFC's peer-to-peer communication can be conducted when a plurality of NFC-enable devices (e.g., smartphones) are within close proximity of each other.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.). Computer-related systems, computer systems, and systems, as used herein, include any combination of hardware and software.

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Examples of software may include software components, programs, applications, operating system software, middleware, firmware, software modules, routines, subroutines, functions, methods, procedures, software interfaces, application program interfaces (API), instruction sets, computer code, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of exemplary inventive computer-based systems/platforms, exemplary inventive computer-based devices, and/or exemplary inventive computer-based components of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud components (e.g., FIG. 3-4) and cloud servers are examples.

In some embodiments, as detailed herein, one or more of exemplary inventive computer-based systems/platforms, exemplary inventive computer-based devices, and/or exemplary inventive computer-based components of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a tweet, a map, an entire application (e.g., a calculator), etc. In some embodiments, as detailed herein, one or more of exemplary inventive computer-based systems/platforms, exemplary inventive computer-based devices, and/or exemplary inventive computer-based components of the present disclosure may be implemented across one or more of various computer platforms such as, but not limited to: (1) AmigaOS, AmigaOS 4; (2) FreeBSD, NetBSD, OpenBSD; (3) Linux; (4) Microsoft Windows; (5) OpenVMS; (6) OS X (Mac OS); (7) OS/2; (8) Solaris; (9) Tru64 UNIX; (10) VM; (11) Android; (12) Bada; (13) BlackBerry OS; (14) Firefox OS; (15) Ios; (16) Embedded Linux; (17) Palm OS; (18) Symbian; (19) Tizen; (20) WebOS; (21) Windows Mobile; (22) Windows Phone; (23) Adobe AIR; (24) Adobe Flash; (25) Adobe Shockwave; (26) Binary Runtime Environment for Wireless (BREW); (27) Cocoa (API); (28) Cocoa Touch; (29) Java Platforms; (30) JavaFX; (31) JavaFX Mobile; (32) Microsoft XNA; (33) Mono; (34) Mozilla Prism, XUL and XULRunner; (35) .NET Framework; (36) Silverlight; (37) Open Web Platform; (38) Oracle Database; (39) Qt; (40) SAP NetWeaver; (41) Smartface; (42) Vexi; and/OR (43) Windows Runtime.

In some embodiments, exemplary inventive computer-based systems/platforms, exemplary inventive computer-based devices, and/or exemplary inventive computer-based components of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application.

For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, exemplary inventive computer-based systems/platforms, exemplary inventive computer-based devices, and/or exemplary inventive computer-based components of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, and/or objects. For example, such projections may be a visual overlay for a mobile augmented reality (MAR) application.

In some embodiments, exemplary inventive computer-based systems/platforms, exemplary inventive computer-based devices, and/or exemplary inventive computer-based components of the present disclosure may be configured to be utilized in various applications which may include, but not limited to, gaming, mobile-device games, video chats, video conferences, live video streaming, video streaming and/or augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, smart watch, or any other reasonable mobile electronic device.

As used herein, the terms "proximity detection," "locating," "location data," "location information," and "location tracking" refer to any form of location tracking technology or locating method that can be used to provide a location of, for example, a particular computing device/system/platform of the present disclosure and/or any associated computing devices, based at least in part on one or more of the following techniques/devices, without limitation: accelerometer(s), gyroscope(s), Global Positioning Systems (GPS); GPS accessed using Bluetooth™; GPS accessed using any reasonable form of wireless and/or non-wireless communication; WiFi™ server location data; Bluetooth™ based location data; triangulation such as, but not limited to, network based triangulation, WiFi™ server information based triangulation, Bluetooth™ server information based triangulation; Cell Identification based triangulation, Enhanced Cell Identification based triangulation, Uplink-Time difference of arrival (U-TDOA) based triangulation, Time of arrival (TOA) based triangulation, Angle of arrival (AOA) based triangulation; techniques and systems using a geographic coordinate system such as, but not limited to, longitudinal and latitudinal based, geodesic height based, Cartesian coordinates based; Radio Frequency Identification such as, but not limited to, Long range RFID, Short range RFID; using any form of RFID tag such as, but not limited to active RFID tags, passive RFID tags, battery assisted passive RFID tags; or any other reasonable way to determine location. For ease, at times the above variations are not listed or are only partially listed; this is in no way meant to be a limitation.

As used herein, the terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

The aforementioned examples are, of course, illustrative and not restrictive.

As used herein, the term "user" shall have a meaning of at least one user. In some embodiments, the terms "user", "subscriber", "consumer", or "customer" should be understood to refer to a user of an application or applications as described herein and/or a consumer of data supplied by a data provider. By way of example, and not limitation, the terms "user" or "subscriber" can refer to a person who receives data provided by the data or service provider over the Internet in a browser session, or can refer to an automated software application which receives the data and stores or processes the data.

At least some aspects of the present disclosure will now be described with reference to the following numbered clauses.

Clause 1. A method comprising:
- obtaining, by a point-of-service (POS) device, upon initiation of a transaction involving (1) a card or (2) the card and a mobile device associated with an individual transacting with the POS device:
  - (i) one or more sensory inputs associated with a use of the one or both of the card and the mobile device for the transaction; and
  - (ii) an identifier (1) associated with a known owner of the one or both of the card and the mobile device and (2) used to determine whether the one or more sensory inputs are consistent with prior transaction behavior of the owner;
- mapping, by the POS device, the one or more sensory inputs to a first cluster position of at least one particular cluster of a plurality of clusters,
  - wherein the plurality of clusters defines sets of hashed, learned features regarding prior known interactions of owners of cards with POS devices, the prior known interactions being mapped by machine learning into the plurality of clusters such that prior sensory input of each owner has been mapped to at least one expected cluster;
- determining, by the POS device, when the cluster position of the at least one particular cluster mapped for the transaction matches a second cluster position of the at least one expected cluster associated with the known owner of the one or both of the card and mobile device; and
- initiating, by the POS device, at least one second factor authentication process to establish that the individual transacting with the POS device is the known owner of the one or both of the card and the mobile device being used in the transaction when the first cluster position of the at least one particular cluster does not correspond to the second cluster position of the at least one expected cluster.

Clause 2. The method of clause 1 or of any clause herein, wherein the plurality of clusters are provided to the POS device via a smart card (SIM card) or other computer-readable medium that is provided from an entity associated with the one or both of the card and the mobile device and/or an entity involved with preventing fraudulent transactions.

Clause 3. The method of clause 1 or of any clause herein, wherein the plurality of clusters are provided to the POS device via download from one or more servers associated with at least one entity involved in the prevention of fraudulent transactions.

Clause 4. The method of clause 1 or of any clause herein, wherein the second factor authentication is triggered via processing performed by the POS device, and the second factor authentication is performed at the POS device.

Clause 5. The method of clause 1 or of any clause herein, wherein the determining when the cluster position of the at least one particular cluster mapped for the transaction matches the second cluster position is performed at the POS device, such that a fraud determination may be performed on-site at the POS device without need for communicating with remote entities to make the fraud determination.

Clause 6. The method of clause 1 or of any clause herein, wherein the one or more inputs comprise one or more of:
- (i) features of the card including one or more of dimension(s) of card, name on card, and/or material and/or color of card;
- (ii) location and/or movement of the card and/or the mobile device; and/or
- (iii) biometric or other information regarding the individual transacting with the card and/or mobile device.

Clause 7. The method of clause 1 or of any clause herein, wherein mapping the one or more sensory inputs to the first cluster position comprises direct mapping of the one or more sensory inputs to the first cluster position.

Clause 8. The method of clause 1 or of any clause herein, wherein mapping the one or more sensory inputs to the first cluster position comprises generating a feature set or model of the one or more sensory inputs, and mapping the feature set or model to the first cluster position.

Clause 9. The method of clause 1 or of any clause herein, further comprising:
- receiving, by the mobile device, the one or more sensory inputs;
- utilizing, by the mobile device, a machine learning algorithm to generate, based on the one or more sensory inputs a feature set representing the one or more sensory inputs; and
- hashing, by the mobile device, the feature set to obtain an expected cluster that is specific to an individual associated with the mobile device.

Clause 10. The method of clause 9 or of any clause herein, wherein the machine learning algorithm is specifically configured to an individual associated with the mobile device.

Clause 11. The method of clause 1 further comprising:
- authorizing, by the POS device, the transaction when the first cluster position of the at least one particular cluster does correspond to the second cluster position of the at least one expected cluster.

Clause 12. The method of clause 1 or of any clause herein, wherein the at least one second factor authentication process comprises generating an alert to a merchant associated with the POS device.

Clause 13. The method of clause 1 or of any clause herein, wherein the at least one second factor authentication process comprises generating an alert to a financial services entity associated with one or more of the POS device, the card, and/or the owner of the mobile device.

Clause 14. A point of service (POS) device comprising:
- at least one card reading component configured to read information from a transaction card, the at least one card reading component comprising one or more of a magnetic stripe reader, a chip reader, and/or a first near field communication (NFC) component;
- at least one mobile device transceiver component configured to communicate, during execution of a purchase transaction, with a mobile device presented for payment, the mobile device transceiver component comprising a second NFC component; and
- one or more processing components and/or computer readable media configured for: obtaining, from one or both of the transaction card and/or the mobile device, upon initiation of the transaction:
  - (i) one or more sensory inputs associated with a use of the one or both of the card and the mobile device for the transaction; and
  - (ii) an identifier (1) associated with a known owner of the one or both of the card and the mobile device and (2) used to determine whether the one or more sensory inputs are consistent with prior transaction behavior of the owner;
- mapping the one or more sensory inputs to a first cluster position of at least one particular cluster of a plurality of clusters,
  - wherein the plurality of clusters defines sets of hashed, learned features regarding prior known interactions of owners of cards with POS devices, the prior known interactions being mapped by machine learning into the plurality of clusters such that prior sensory input of each owner has been mapped to at least one expected cluster;
- determining when the cluster position of the at least one particular cluster mapped for the transaction matches a second cluster position of the at least one expected cluster associated with the known owner of the one or both of the card and mobile device; and
- initiating at least one second factor authentication process to establish that the individual transacting with the POS device is the known owner of the one or both of the card and the mobile device being used in the transaction when the first cluster position of the at least one particular cluster does not correspond to the second cluster position of the at least one expected cluster.

Clause 15. The device of clause 14 or of any clause herein, wherein the plurality of clusters are provided to the POS device via provision of a smart card or computer-readable medium from an entity associated with the one or both of the card and the mobile device and/or an entity involved with preventing fraudulent transactions.

Clause 16. The device of clause 14 or of any clause herein, wherein the plurality of clusters are provided to the POS device via download from one or more servers associated with at least one entity involved with preventing fraudulent transactions.

Clause 17. The device of clause 14 or of any clause herein, wherein the second factor authentication is performed at the POS device.

Clause 18. The device of clause 14 or of any clause herein, wherein the determining when the cluster position of the at least one particular cluster matches the second cluster position is performed at the POS device, such that a fraud determination may be performed on-site at the POS device without need for communicating with remote entities to make the fraud determination.

Clause 19. The device of clause 14 or of any clause herein, wherein the one or more sensory inputs comprise one or more of:
- (i) features of the card including one or more of dimension(s) of card, name on card, and/or material and/or color of card;
- (ii) location and/or movement of the card and/or the mobile device; and/or
- (iii) biometric or other information regarding the individual transacting with the card and/or mobile device.

Clause 20. The device of clause 14 or of any clause herein, wherein mapping the one or more sensory inputs to the first cluster position comprises direct mapping of the one or more sensory inputs to the first cluster position.

Clause 21. The device of clause 14 or of any clause herein, wherein mapping the one or more sensory inputs to the first cluster position comprises generating a feature set or model of the one or more sensory inputs, and mapping the feature set or model to the first cluster position.

Clause 22. The device of clause 14 or of any clause herein, wherein the one or more processing components and/or computer readable media are further configured for:
- receiving, by the mobile device, the one or more sensory inputs;
- utilizing, by the mobile device, a machine learning algorithm to generate, based on the one or more sensory inputs a feature set representing the one or more sensory inputs; and
- hashing, by the mobile device, the feature set to obtain an expected cluster that is specific to an individual associated with the mobile device.

Clause 23. The device of clause 22 or of any clause herein, wherein the machine learning algorithm is specifically configured to an individual associated with the mobile device.

Clause 24. The device of clause 14 or of any clause herein, wherein the one or more processing components and/or computer readable media are further configured for:
- authorizing, by the POS device, the transaction when the first cluster position of the at least one particular cluster does correspond to the second cluster position of the at least one expected cluster.

Clause 25. The device of clause 14 or of any clause herein, wherein the at least one second factor authentication process comprises generating an alert to a merchant associated with the POS device.

Clause 26. The device of clause 14 or of any clause herein, wherein the at least one second factor authentication process comprises generating an alert to a financial services entity associated with one or more of the POS device, the card, and/or the owner of the mobile device.

Clause 27. Embodiments herein may also take the form of a system comprised of computing elements that are arranged, programmed and/or otherwise adapted to perform the features and functionality set forth anywhere above. Such computing elements may include and/or involve computer readable media.

Clause 20. In addition, embodiments herein may also take the form of one or more computer readable media containing computer-executable instructions for performing any of the processing herein, the computer-executable instructions being executable via one or more processing components to process instructions and/or perform one or more aspects of the functionality set forth herein.

While one or more embodiments of the present disclosure have been described, it is understood that these embodiments are illustrative only, and not restrictive, and that many modifications may become apparent to those of ordinary skill in the art, including that various embodiments of the inventive methodologies, the inventive systems/platforms, and the inventive devices described herein can be utilized in any combination with each other. Further still, the various steps may be carried out in any desired order (and any desired steps may be added and/or any desired steps may be eliminated).

The invention claimed is:

1. One or more computer-readable media containing and/or configured to execute computer-readable instructions, the computer-readable instructions comprising instructions that, when executed by one or more processors, cause the one or more processors to perform a method comprising:
   obtaining, by a point-of-service (POS) device, upon initiation of a transaction involving (1) a card or (2) the card and a mobile device associated with an individual transacting with the POS device:
      (i) one or more sensory inputs associated with a use of the one or both of the card and the mobile device for the transaction, the one or more sensory inputs comprising one or more card-acquired sensory inputs received from one or more sensors on the card;
         wherein the one or more sensory inputs comprise sensory feedback measured by the one or more sensors based on usage of the card for the transaction; and
         wherein the one or more sensory inputs are saved into the card as a feature set and transmitted to the POS device upon the initiation of the transaction; and
      (ii) an identifier (1) associated with an owner of the one or both of the card and the mobile device and (2) used to determine whether the one or more sensory inputs are consistent with prior transaction behavior of the owner;
   transforming, using a machine learning technique, the one or more sensory inputs associated with the transaction into feature information having a format configured for comparison against historical feature data established by applying the machine learning technique to historical card-usage information of the owner;
   performing sensory input mapping of the feature information to a cluster position of at least one particular cluster of a plurality of clusters, wherein the plurality of clusters defines sets of learned features regarding prior known interactions of owners of cards with POS devices;
   performing a fraud determination based on mapping of the cluster position of the at least one particular cluster to at least one expected cluster associated with the known owner of the one or both of the card and mobile device; and
   approving the transaction based on the fraud determination.

2. The computer-readable media of claim 1 wherein the plurality of clusters are provided to the POS device via a smart card (SIM card) or other computer-readable medium that is provided from an entity associated with the one or both of the card and the mobile device and/or an entity involved with preventing fraudulent transactions.

3. The computer-readable media of claim 1 wherein the plurality of clusters are provided to the POS device via download from one or more servers associated with at least one entity involved in the prevention of fraudulent transactions.

4. The computer-readable media of claim 1, wherein the method further comprises:
   initiating, by the POS device, at least one second factor authentication process to establish that the individual transacting with the POS device is the known owner of the one or both of the card and the mobile device being used in the transaction when the first cluster position of the at least one particular cluster does not correspond to the second cluster position of the at least one expected cluster; and/or, optionally:
   wherein the second factor authentication is triggered via processing performed by the POS device, and the second factor authentication is performed at the POS device.

5. The computer-readable media of claim 1 wherein the determining when the cluster position of the at least one particular cluster mapped for the transaction matches the second cluster position is performed at the POS device, such that the fraud determination may be performed on-site at the POS device without need for communicating with remote entities to make the fraud determination.

6. The computer-readable media of claim 1 wherein the one or more inputs comprise one or more of:
   (i) features of the card including one or more of dimension(s) of card, name on card, and/or material and/or color of card;
   (ii) location and/or movement of the card and/or the mobile device; and/or
   (iii) biometric or other information regarding the individual transacting with the card and/or mobile device.

7. The computer-readable media of claim 1 wherein mapping the one or more sensory inputs to the first cluster position comprises direct mapping of the one or more sensory inputs to the first cluster position.

8. The computer-readable media of claim 1 wherein mapping the one or more sensory inputs to the first cluster position comprises generating a feature set or model of the one or more sensory inputs, and mapping the feature set or model to the first cluster position.

9. The computer-readable media of claim 1, wherein the method further comprises:
   receiving, by the mobile device, the one or more sensory inputs;
   utilizing, by the mobile device, a machine learning algorithm to generate, based on the one or more sensory inputs a feature set representing the one or more sensory inputs; and
   hashing, by the mobile device, the feature set to obtain an expected cluster that is specific to an individual associated with the mobile device.

10. The computer-readable media of claim 9 wherein the machine learning algorithm is specifically configured to an individual associated with the mobile device.

11. The computer-readable media of claim 1, wherein the method further comprises:

authorizing the transaction when the first cluster position of the at least one particular cluster does correspond to the second cluster position of the at least one expected cluster.

12. The computer-readable media of claim 1, wherein the method further comprises:
implementing a second factor authentication process to approve the transaction, wherein the second factor authentication process comprises generating an alert to a merchant associated with the POS device.

13. The computer-readable media of claim 1, wherein the method further comprises:
implementing a second factor authentication process to approve the transaction, wherein the second factor authentication process comprises generating an alert to a financial services entity associated with one or more of the POS device, the card, and/or the owner of the mobile device.

14. A point of service (POS) device comprising:
at least one card reading component configured to read information from a transaction card, the at least one card reading component comprising one or more of a magnetic stripe reader, a chip reader, and/or a first near field communication (NFC) component;
at least one mobile device transceiver component configured to communicate, during execution of a purchase transaction, with a mobile device presented for payment, the mobile device transceiver component comprising a second NFC component; and
one or more processing components and/or computer readable media configured for:
obtaining, from one or both of the transaction card and/or the mobile device, upon initiation of the transaction:
(i) one or more sensory inputs associated with a use of the one or both of the card and the mobile device for the transaction, the one or more sensory inputs comprising one or more card-acquired sensory inputs received from one or more sensors on the card;
wherein the one or more sensory inputs comprising sensory feedback measured by the one or more sensors based on usage of the card for the transaction; and
wherein the one or more sensory inputs are saved into the card as a feature set, and transmitted to the POS device upon the initiation of the transaction; and
(ii) an identifier (1) associated with a known owner of the one or both of the card and the mobile device and (2) used to determine whether the one or more sensory inputs are consistent with prior transaction behavior of the owner;
transforming, using a machine learning technique, the one or more sensory inputs associated with the transaction into feature information having a format configured for comparison against historical feature data established by applying the machine learning technique to historical card-usage information of the owner;
performing sensory input mapping of the feature information to a first cluster position of at least one particular cluster of a plurality of clusters,
wherein the plurality of clusters defines sets of learned features regarding prior known interactions of owners of cards with POS devices, the prior known interactions being mapped by the machine learning technique into the plurality of clusters such that prior sensory input of each owner has been mapped to at least one expected cluster;
performing a fraud determination based on mapping of the cluster position of the at least one particular cluster to the at least one expected cluster associated with the known owner of the one or both of the card and mobile device; and
approving the transaction based on the fraud determination.

15. The device of claim 14, wherein the plurality of clusters are provided to the POS device via provision of a smart card or computer-readable medium from an entity associated with the one or both of the card and the mobile device and/or an entity involved with preventing fraudulent transactions.

16. The device of claim 14, wherein the plurality of clusters are provided to the POS device via download from one or more servers associated with at least one entity involved with preventing fraudulent transactions.

17. The device of claim 14, wherein the one or more processing components and/or computer readable media are further configured for:
performing a second factor authentication is performed at the POS device.

18. The device of claim 14, wherein the determining when the cluster position of the at least one particular cluster matches the second cluster position is performed at the POS device, such that a fraud determination may be performed on-site at the POS device without need for communicating with remote entities to make the fraud determination.

19. The device of claim 14, wherein mapping the one or more sensory inputs to the first cluster position comprises direct mapping of the one or more sensory inputs to the first cluster position.

20. The device of claim 14, wherein mapping the one or more sensory inputs to the first cluster position comprises generating a feature set or model of the one or more sensory inputs, and mapping the feature set or model to the first cluster position.

* * * * *